Nov. 3, 1964  D. S. ADAMS  3,155,754
PROCESS FOR PRODUCING ORIENTED SYNTHETIC LINEAR
POLYESTER FIBERS AND FILMS HAVING
A SHEATH-CORE STRUCTURE
Filed April 11, 1962

INVENTOR
DUSTIN S. ADAMS

BY
ATTORNEY

United States Patent Office 3,155,754
Patented Nov. 3, 1964

3,155,754
PROCESS FOR PRODUCING ORIENTED SYNTHETIC LINEAR POLYESTER FIBERS AND FILMS HAVING A SHEATH-CORE STRUCTURE
Dustin S. Adams, Wilmington, Del., assignor to E. I. du Pont de Nemours and Company, Wilmington, Del., a corporation of Delaware
Filed Apr. 11, 1962, Ser. No. 187,160
7 Claims. (Cl. 264—78)

This invention relates to the treatment of synthetic linear polyesters. More particularly it relates to a method of treating polyester shaped structures to modify the physical structure thereof.

Synthetic linear polyesters prepared from dibasic aromatic acids and glycols having from 2 to 10 carbon atoms, such as those disclosed by Whinfield in U.S. 2,465,319, and by Kibler in U.S. 2,901,466 possess many properties which make them useful as articles of commerce, especially in the form of fibers and films. However, due to a combination of the chemical inertness of the polymer and the high degree of compactness of oriented shaped structures produced therefrom, articles manufactured from these polyesters have suffered from the disadvantages of poor dyeability as well as high resistance to the attachment of various polymeric coatings to their surfaces. Special dyeing procedures have been developed utilizing swelling agents or "carriers" to enable dyes to more easily penetrate the dense polyester structure. Also, numerous pretreatments have been explored in an attempt to make the polyester surfaces more attractive to polymeric coatings such as antistatic coatings and the like. These procedures have not been generally satisfactory for all purposes.

This invention has as its object the modification of the surfaces of shaped structures of synthetic linear polyesters to make said structures more receptive to dyes and various types of coatings.

Another object is the provision of a method for preparing from synethetic linear polyesters oriented fibers which have a pronounced sheath-core structure wherein the sheath is more reactive than the core.

Another object is the provision of a procedure for preparing oriented filaments from synthetic linear polyesters which are more easily dyed than the normal oriented fiber.

A still further object is the provision of a procedure for preparing oriented fibers, ribbons, films, and the like from synthetic linear polyesters which are more receptive to the attachment of polymeric coatings. Other objects will appear as the description of the invention proceeds.

The objects of this invention are obtained by a process in which melt extruded, solvent-free, unoriented synthetic linear polyester-shaped structures are contacted for a period of 0.02 second to about 3.0 seconds with a liquid semisolvent and then oriented by drawing in an aqueous bath at a temperature of at least 80° C.

Figure 1A:
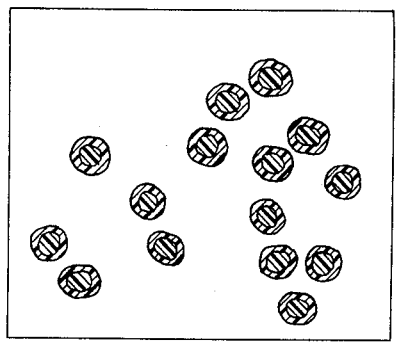
FIGURE 1a illustrates a magnified cross-sectional view of drawn fibers produced by the process of this invention.
Figure 1B:
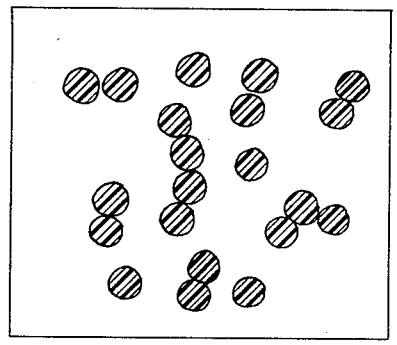
FIGURE 1b illustrates a magnified cross-sectional view of drawn fibers produced by a conventional process.

Surprisingly, when oriented fibers are prepared from synthetic linear polyesters by the process of this invention, the resulting fibers have a well defined sheath-core structure in which the core is that of a normal, tough, oriented crystalline polyester while the sheath, although crystalline, has less orientation than the core, is considerably easier to dye, and is more adherent to coatings of various types. Another surprising feature is the fact that fibers produced by the process of this invention have substantially the same tensile properties as fibers produced by older processes. Thus, the advantages of a "softer" fiber are obtained without sacrificing tensile properties such as strength and modulus.

The term "semisolvent" as used in the description of this invention is intended to include all compounds and mixtures of compounds which are on the border line of true solvents for synthetic linear polyesters under the conditions of use. Thus, the list of semisolvents would include true solvents diluted with a nonsolvent. Also included are compounds which are true solvents for polyesters at an elevated temperature but which are not solvents at the temperatures of this process. Likewise, the term "semisolvent" includes compounds shown to be effective by simple tests defined below and in Example VII from the class of reagents which are referred to in the art as "swelling agents" and "crystallizing agents" for synthetic linear polyesters.

The semisolvents useful in the process of this invention are defined by the following simple test, easily and quickly carried out in the laboratory: A sample of the undrawn synthetic linear polyester yarn is immersed in the liquid semisolvent candidate for a period of one minute at room temperature, rinsed in water, and then immediately drawn by hand. Liquids which are not operable as semisolvents in the process of this invention have no effect upon the normal drawing forces; i.e., the yarn draws by the normal "necking" process with normal drawing tension as if wetted with water only. In contrast, liquids which are effective semisolvents in the process of this invention cause the undrawn yarn to disintegrate, or to exhibit a pronounced and unmistakable reduction in drawing tension, usually without neck formation in the draw zone.

"Necking" during drawing of fibers is described by Rowland Hill in Fibers From Synthetic Polymers, Elsevier, New York, 1953, pp. 257–258.

If a more precise and quantitative test for semisolvents is desired, the above procedure may be modified by hanging a loop of the treated undrawn yarn on a hook, attaching an aluminum beaker to the bottom of the loop by another hook, and then slowly pouring water into the beaker until extension of the loop begins. The beaker of water is then weighed to determine the load necessary to start extension of the yarn. The load is compared with that required to extend a similar loop of untreated yarn. This variation in procedure is useful for distinguishing between weak semisolvents and nonsolvents.

Undrawn, 250 denier, 50 filament, polyethylene terephthalate yarn when tested in this manner with water (control), or nonsolvents such as ethanol, methanol, formaldehyde (37%), n-heptane, carbon tetrachloride and ethylene glycol, draws with normal "necking" and the load necessary to start extension is 430 to 440 grams. Solvents which cause disintegration under the conditions of this test, such as methylene chloride, can be used in the process of this invention by restricting their solvent action as disclosed hereinafter. Semisolvents which effectively lower the drawing tension generally provide neckless elongation in this test. Table I gives several illustrations of the extent to which such semisolvents lower the load needed to initiate elongation.

TABLE I

| Semisolvent: | Measured load (grams) |
|---|---|
| Methyl cellosolve | 390 |
| 4,4-dimethyl-m-dioxane | 320 |
| Acetone | 280 |
| Benzene | 270 |
| 2-butanone | 260 |
| Epichlorohydrin | 200 |
| Furfuryl alcohol | 190 |

Reagents which cause undrawn yarn to disintegrate in the above test usually require dilution with a nonsolvent for best operability in the process of this invention.

Many solvents, swelling agents, and crystallizing agents are known for synthetic linear polyesters. Compounds suitable for use in the process of this invention are disclosed, for example, in U.S. 2,899,348, U.S. 2,861,970, U.S. 2,861,969, U.S. 2,861,049, U.S. 2,840,536, U.S. 2,830,030, U.S. 2,762,788, U.S. 2,743,250, U.S. 2,683,100, British 797,425, British 822,483, British 714,502, British 645,032, and British 609,948.

Among the preferred semisolvents are dioxane/water mixtures in the weight ratio range 60:40 to 90:10, dioxane/ethyl alcohol mixtures in the weight ratio range 60:40 to 80:20, dimethyl formamide/ethyl alcohol mixtures in the weight ratio range 50:50 to 80:20, and tetramethylbutylphenol/ethyl alcohol mixtures in the weight ratio range 10:90 to 40:60. Other compounds useful in the process of this invention include acetone, acetonitrile, methylene chloride, ethylene chloride, epichlorohydrin, benzyl alcohol, tetrahydrofuran, 2-butanone, benzene, chloroform, trichloroethylene, tetrachloroethane, furfuryl alcohol, acetyl acetone, dioxane, 4,4'-dimethyl-m-dioxane, dimethylformamide (DMF), pyridine, ethyl acetate, tetramethylbutyl phenol (TMBP), 3,5-dimethylphenol, and trifluoroacetic acid.

The magnitude of the sheath-core effect produced by the process of this invention may be regulated by adjusting the contact time for the semisolvent treatment as well as by adjusting the concentration of solvent in a diluent. Thus, synthetic linear polyester fibers having a thicker sheath may be obtained in the process of this invention by lengthening the contact time with the semisolvent, by using higher concentrations of solvent in a diluent, or by using a more potent semisolvent. Alternatively, the action of the more powerful semisolvents may be reduced, with an accompanying reduction in sheath thickness, by reducing contact time with the semisolvent, or by reducing the concentration of the solvent in the diluent.

Figure 2:
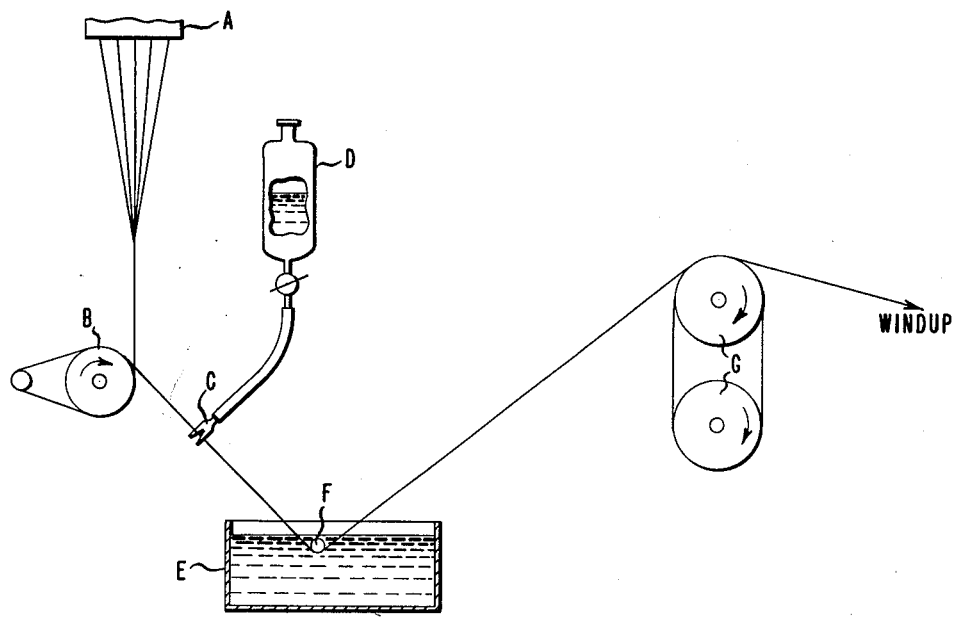
FIGURE 2 is a schematic arrangement of apparatus useful in carrying out one embodiment of the invention.

In a preferred embodiment of this invention, synthetic linear polyester fibers are spun from a solvent-free melt, contacted with a semisolvent, and drawn in one continuous operation. Such a procedure is illustrated in FIGURE 2. The molten synthetic linear polyester is extruded through the holes of spinneret A, quenched in air, and passed around driven feed rolls B which determine the linear speed of the undrawn yarn. The yarn then contacts a wetted guide C, which is supplied with semisolvent from reservoir D, and then passes to drawbath E which contains water heated to a temperature of 80–100° C. The yarn passes under drawpin F, where drawing tension is applied, and then proceeds to draw rolls G, driven at about 4 times the surface speed of the feed rolls, and then passes to a windup, not shown. It is obvious from the drawing in FIGURE 2 that the length of time the yarn is in contact with the semisolvent before hitting the hot water bath is determined by the distance between the wetted guide C and the surface of the water in the bath, and the speed of the yarn. For example, if the undrawn yarn is traveling at a rate of 400 yards per minute and the distance between guide C and the water bath is 12 inches, then the contact time is 0.05 second.

It is to be understood that the above-described procedure is a preferred embodiment. It is not necessary for all of the steps of the process to be carried out in one continuous operation. For example, the synthetic linear polyester may be melt spun and wound up on a bobbin in an undrawn condition. The undrawn yarn may then, in a separate step, be contacted with a semisolvent for a length of time from 0.2 to 3.0 seconds, with the semisolvent being immediately removed, e.g., by washing. Then, after a period of several minutes, the treated yarn may be drawn in a hot aqueous bath at a temperature above 80° C.

A particularly advantageous feature of this invention is the fact that the process of the invention may be combined with the application of surface additives to the synthetic linear polyester structure. For example, dyes, pigments, or antistatic agents may be suspended in the hot aqueous draw bath and will, because of the soft sheath produced on the polyester structure, become attached to the polyester structure as it proceeds through the draw bath. To obtain dyed fibers, it has been found to be convenient in some instances to dissolve the dye in the semisolvent which is applied to the undrawn polyester structure.

The following examples more clearly illustrate the invention:

*Example I*

High molecular weight polyethylene terephthalate filaments, melt spun without solvent in conventional manner and quenched in air, are drawn in the manner illustrated in FIGURE 2. Undrawn yarn from the 34-hole spinneret A is passed around feed rolls B which rotate with a surface speed of 403 yards per minute. The yarn then contacts wetted guide C which is wetted with dioxane applied from reservoir D. The undrawn yarn passes into the 95° C. water bath, around the drawpin F, and then proceeds to the draw rolls G which are rotating at a surface speed of 1470 yards per minute and are heated to 140° C. The distance from the wetted guide to the water bath is such that the dioxane contacts the yarn for a period of 0.4 second. Photomicrographs taken of cross sections of the drawn yarn reveal that the filaments have a distinct sheath-core structure with the sheath occupying about 20% of the filament radius.

*Example II*

The procedure of Example I is repeated using acetone instead of dioxane. Substantially the same results are obtained, i.e., filament cross sections exhibit a pronounced double ring structure with the outer ring occupying about 20% of the filament radius.

*Example III*

Polyethylene terephthalate is melt spun according to the general procedure of Example I. The feed rolls are operated at a speed of 400 y.p.m. while the draw rolls are operated at 1795 y.p.m. with the draw rolls being heated to the temperature of 160° C. The wetted guide C of FIGURE 2 is supplied with a dioxane/water mixture containing 60% dioxane by weight. The distance between wetted guide C and the surface of the water in draw bath E is such that the yarn contacts the dioxane/water mixture for about 0.2 second before it enters the water. Drawn yarn produced in this example exhibits the same sheath-core structure noted in Example I except that the sheath is thinner than that noted in Example I.

*Example IV*

Polyethylene terephthalate is melt spun and drawn following the procedure of Example III. The water in the draw bath contains 1.6% of a polyethylene glycol amine (Belgium 554,506, Ex. I). The effect of the semisolvent pretreatment upon the pickup of the polyethylene glycol amine is shown by the fact that samples of the drawn yarn boiled for 5 minutes in a 0.05% solution of Direct Red 79 (C.I. 29065) dye to a color several shades deeper than yarn processed in the same general manner but which was not wetted with the dioxane/water mixture.

*Example V*

The experiment of Example I is repeated using a 70% solution of dioxane in water to wet guide C. A control sample is prepared in the same manner without the dioxane/water mixture being applied. The physical properties of the two drawn yarns are then compared and it is found that the yarn pretreated with dioxane is substantially equivalent to the control yarn, as shown in the following table.

TABLE II

| Property | Test Yarn | Control Yarn |
|---|---|---|
| Denier | 71.0 | 71.6 |
| Tenacity, g.p.d. | 3.8 | 4.0 |
| Breaking strength, grams | 267 | 286 |
| Break elongation, percent | 21.2 | 24.2 |
| Residual shrinkage, percent | 9.6 | 10.6 |

*Example VI*

The experiment of Example IV is repeated using 70% aqueous dioxane to prewet the yarn and using 1.6% polyethylene glycol amine in the draw bath. After passing over the draw rolls, the yarn is passed through an aqueous dispersion of the copolymer glycidyl methacrylate/sodium styrene sulfonate, passed again over rolls heated to a temperature of 160° C. to dry the yarn, and then wound up. Fabric samples are woven from the yarn and the durability of the glycidyl methacrylate/sodium styrene sulfonate antistatic coating compared with control samples. The results are shown in the table below, where lower log R ratings and lower static decay ratings indicate better antistatic properties.

TABLE III

| Treatment | Test Sample | Control Sample |
|---|---|---|
| | Log R | |
| Water Rinse | 10.0 | 11.0 |
| Detergent scour, 60 min./100° C. | 10.9 | 12.4 |
| 1% NaOH boil, 30 min./100° C. | 11.8 | 11.9 |
| 1% NaOH boil, 60 min./100° C. | 12.5 | 14.3 |
| Lab. Wash/Iron, 10X | 12.7 | 14.0 |
| | Static Decay $T_{1/2}$ | |
| 1% NaOH boil, 60 min./100° C. sec | 4 | 180 |
| Lab. Wash/Iron, 10X sec | 2 | >300 |
| Commercial laundry, 5X sec | 134 | >600 |

*Example VII*

Skeins of undrawn, solvent-free polyethylene terephthalate yarn, 250 denier–50 filament, are dipped for a period of 1–3 seconds in various semisolvents, washed immediately and thoroughly with water, and then drawn to the natural draw ratio of the yarn while immersed in boiling water containing 1% Methylene Blue. The drawn yarn is then washed in a soap solution and rinsed in clear water. It is found that the fibers which exhibit the distinct sheath-core structure characteristic of the products of this invention have picked up Methylene Blue from the draw bath and the Methylene Blue has been concentrated in the outer or sheath layer of each filament. Conversely, filaments which were not contacted before drawing with an organic compound falling within the scope of this invention do not exhibit the sheath-core structure and have not picked up Methylene Blue from the draw bath.

The depth of color assumed by the fibers of this example is found to be a direct function of the effectiveness of the pretreating organic liquid. The results obtained with the various liquids are summarized in Table IV, using a color scale with ratings from 0 to 4 where 0 indicates no color at all and 4 represents a very deep color.

TABLE IV

| Pretreating agent: | Color intensity |
|---|---|
| None (control) | 0 |
| Benzene | 1–2 |
| Xylene | 1 |
| Trichloroethylene | 2 |
| Tetrachloroethylene | 1 |
| Chlorocyclohexane | 1 |
| Epichlorohydrin | 2–3 |
| Furfuryl alcohol | 2–3 |
| Acetone | 2 |
| Acetyl acetone | 2–3 |
| 4,4'-dimethyl-m-dioxane | 3 |
| 2-butanone | 2–3 |
| Acetonitrile | 2 |
| Triethylamine | 1 |
| Resorcinol (50%) | 1 |
| Tetramethylbutyl phenol (10% in ethanol) | 2–3 |
| 3,5-dimethyl phenol (25% in ethanol) | 2 |
| Benzophenone (25% in ethanol) | 1 |
| Trifluoroacetic acid (25% in water) | 1 |
| Oxalic acid (10% in water) | 1 |
| Dimethylformamide/ethanol 50:50 | 2 |
| Dimethylformamide/ethanol 75:25 | 4 |
| Methylene chloride/ethanol 25:75 | 1 |
| Methylene chloride/ethanol 50:50 | 2 |
| Ethyl acetate/ethanol 50:50 | 1 |
| Dioxane/$H_2O$ 50:50 | 1–2 |
| Dioxane/ethanol 50:50 | 1–2 |
| Dioxane/$H_2O$ 75:25 | 3 |
| Dioxane/ethanol 75:25 | 4 |
| Tetramethylbutyl phenol/ethanol 10:90 | 2 |
| Tetramethylbutyl phenol/ethanol 25:75 | 3 |
| Tetramethylbutyl phenol/ethanol 50:50 | 4 |

Filaments pretreated with the following compounds which are outside the scope of this invention did not accept Methylene Blue dye from the draw bath:

| | |
|---|---|
| n-Heptane | 0 |
| Cyclohexane | 0 |
| Ethanol | 0 |
| Methanol | 0 |
| Ethylene glycol | 0 |
| Carbon tetrachloride | 0 |
| Formaldehyde (37%) | 0 |
| Boric acid (25% in water) | 0 |
| Hydroquinone (25% in ethanol) | 0 |

*Example VIII*

The enhanced reactivity of the surface of the fibers produced by the process of this invention is shown by the following experiment: Yarn samples produced according to the procedure of Example V are boiled in 1% sodium hydroxide for 60 minutes. Weight loss is measured by weighing the yarns before and after this sodium hydroxide treatment. It is found that the yarn which was treated with 70% dioxane in water before drawing lost 4.2% in weight whereas the control yarn lost only 2.1% of its original weight.

*Example IX*

The procedure of Example III is repeated with the addition of a second "wetted guide" contacting the yarn between the draw bath and draw rolls of FIGURE 2, with a dilute dispersion of a fluorescent brightening agent having the formula

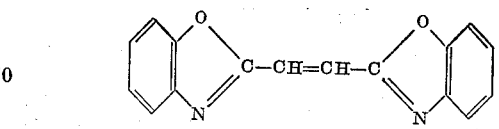

being supplied to the guide. The drawn yarn is washed in boiling water and tested for fluorescence under a ultraviolet lamp. The yarn is found to be highly fluorescent, whereas similarly prepared control yarn, not treated with aqueous dioxane before drawing, showed no fluorescence whatsoever.

*Example X*

The procedure of Example IX is repeated with a 1% slurry of micro-pulverized titanium dioxide in water being applied to the yarn from the second wetted guide. The drawn yarn is found to have picked up TiO$_2$ particles on the surfaces of the filaments with a resultant remarkable decrease in friction. Measurement of the coefficient of friction of the drawn yarn yields a value of 0.31. This is in contrast to the high value of 0.76 for the control yarn and the intermediate value of 0.48 for the yarn which was treated with aqueous dioxane but which did not contact the TiO$_2$ slurry.

The coefficient of friction, $f$, is measured by running the yarn over a smooth chrome-plated pin, having diameter of ⅜", at a speed of 250 yards per minute. A 170° turn is made at the pin. The tension in the yarn, $T$, is measured on each side of the pin and the coefficient of friction calculated from the belt formula $$f = a \ln \frac{T_2}{T_1}$$

where $a$ is the angle of wrap in radians. A more extensive discussion of the coefficient of friction may be found in an article by Howell, Mieszkis, and Tabor on Friction in Textiles in Butterworth Sci. Publ., London, 1959, p. 189.

*Example XI*

Polyethylene terephthalate yarn drawn according to the procdure of Example V is tested for dyeability. The test yarn is immersed, along with a control yarn, in a 1% solution of a dispersed type violet dye and boiled for 30 minutes. The test yarn is found to be several shades darker than the control yarn when the dyeing is complete.

The test is repeated using a basic dye, Fuchsine. As before, the test yarn is found to be several shades darker than control.

*Example XII*

An undrawn, solvent-free polyethylene terephthalate "ribbon" monofilament is drawn by passing it from a feed roll operating at 16 yards per minute, through a bath of 100% dimethylformamide (DMF) held at room temperature, then through a water bath heated to 85° C., then around a pair of draw rolls operating at 75 y.p.m., and finally to a windup. The geometry of the apparatus is such that the monofilament contacts the DMF for a distance of 12 inches before entering the water bath, giving a DMF exposure time of 0.8 second. The draw point, visible as a sharply defined neck in the filament, is located between the draw rolls and the water bath dip guide at a point approximately ⅛ inch from the guide.

The drawn filament is found to have a denier of 454, a tenacity of 2.8 g.p.d., a break elongation of 18%, an initial modulus of 101 g.p.d., and a boil-off shrinkage of about 10%. Stress-strain curves prepared from a series of samples indicate a remarkable degree of uniformity. A sample of the drawn monofilament is dyed for 10 minutes at 100° C. in an aqueous bath containing a dispersed red dye (Color Index No. 60755). A deep red color is produced, whereas a light red color results when normally drawn polyethylene terephthalate is dyed in the same way.

*Example XIII*

The procedure of Example VII is repeated using skeins of yarn prepared from the copolyester of polyethylene terephthalate containing 2 mol percent of 5-sodium-sulfoisophthalate. The yarn has a total denier of 110 and is composed of filaments having a trilobal cross section. As in Example VII, the effect of various solvents upon the structure of the filaments is demonstrated by the amount of Methylene Blue dye picked up from the draw bath as shown in the following table:

TABLE V

| Pretreating agent: | Color intensity |
|---|---|
| None (control) | 2 |
| Dioxane/H$_2$O 70:30 | 4 |
| Methyl cellosolve | 3 |
| Acetone | 3 |
| Benzene | 3–4 |

*Example XIV*

The procedure of Example VII is repeated using skeins of 290 denier yarn prepared from the copolymer prepared from ethylene glycol, dimethyl terephthalate, and dimethyl isophthalate, wherein 10% of the acid units are isophthalic acid units. The relative coloration produced by the pickup of Methylene Blue from the draw bath is shown in the following table:

TABLE VI

| Pretreating agent: | Color |
|---|---|
| H$_2$O | 1 |
| Methyl cellosolve | 1–2 |
| Benzene | 3 |

Inspection of the filament cross sections by microscope reveals that a distinct sheath-core structure is present in those filaments pretreated with methyl cellosolve and benzene.

Although the application of this invention has been particularly described with respect to polyethylene terephthalate yarns, it is equally applicable to other high molecular weight linear polyesters capable of being drawn into high strength yarns, ribbons, films, and the like, particularly the linear terephthalate polyesters. By "linear terephthalate polyesters" is meant a linear condensation polyester comprising recurring glycol dicarboxylate structural units in which at least about 85% of the recurring structural units are units of the formula

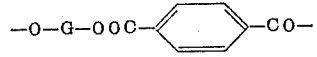

wherein —G— represents a divalent oragnic radical containing from 2 to about 18 carbon atoms and attached to the adjacent oxygen atoms by saturated carbon atoms. Preferably, the radical —G— contains from 2 to about 10 carbon atoms. The terephthalate radical may be the sole dicarboxylate constituent of the recurring structural units, or up to about 15% of the recurring structural units may contain other dicarboxylate radicals, such as the adipate, sebacate, isophthalate, bibenzoate, and hexahydroterephthalate radicals. The linear terephthalate polyesters may be prepared by reacting terephthalic acid or a mixture of terephthalic acid and one or more other dicarboxylic acids with a glycol, G(OH)$_2$, where —G— is a radical as defined above, to form the bis-glycol ester or mixture of esters, followed by polycondensation at elevated temperature and reduced pressure with elimination of excess glycol. In place of the acid or acids, ester-forming derivatives may be used, i.e., derivatives which readily undergo polyesterification with a glycol or derivative thereof. For example, the acid chloride or a lower alkyl ester, such as the dimethyl ester, may be used. Similarly, an ester-forming derivative of the glycol may be used in place of the glycol; i.e., a derivative of the glycol which readily undergoes polyesterification with dicarboxylic acids or derivatives thereof. For example, a cyclic oxide from which the corresponding glycol can be derived by hydrolysis may be used.

The glycol, G(OH)$_2$, from which the polyester is prepared may be any suitable dihydroxy compound containing from 2 to 18 carbon atoms, preferably from 2 to 10 carbon atoms, in which the hydroxyl groups are attached to saturated carbon atoms. Thus, the radical —G— may be of the form —C$_{n+1}$H$_{2n+2}$Y$_{p-1}$)— where $n$ and $p$ are positive integers and Y is a cycloaliphatic group, or an aromatic group. Examples of suitable glycols where $p=1$ include the polymethylene glycols, such as ethylene glycol, tetramethylene glycol, hexamethylene glycol, and decamethylene glycol as well as the branched chain glycols such as 2,2-dimethyl-1,3-propanediol and 2,2-dimethyl-1,4-butanediol. Suitable glycols in which $p=2$ include trans-p-hexahydroxylene glycol, and bis-p-(2-hydroxy-ethyl)benzene. Glycols in which $p=3$ include 4,4' - bis - ($\beta$ - hydroxyethyl)biphenyl, 2,2-bis(4-hydroxyphenyl)propane, and 4,4'-bis-($\beta$-hydroxyethyl)dodecahydrobiphenyl. In general, the glycols in which $p$ is greater than 3 are of lesser interest. Mixtures of the glycols may be used.

While the foregoing description has been made with respect to certain specific embodiments of the present invention, it is to be understood that changes and modifications may be made without departing from the spirit and scope of the invention as defined in the appended claims.

I claim:

1. In the production of oriented synthetic linear terephthalate polyester fiber structures by extruding a solvent-free melt of the polyester to form fibers and solidifying the fibers to an unoriented structure, and drawing the solid fibers to orient the structure, the improvement for modifying the surface to provide a distinct sheath-core structure which comprises contacting the dry unoriented fibers with a liquid semisolvent for the polyester for a period of 0.2 second to about 3.0 seconds with immediate removal of the liquid semisolvent, and then orienting the structure by drawing in a water bath at a temperature of about 80° to 100° C., said liquid semisolvent being effective to provide a pronounced reduction in drawing tension when tested by contacting the fibers with the semisolvent for one minute, rinsing with water and then immediately drawing to orient the structure.

2. A process as defined in claim 1 wherein the structure is drawn in the water bath within 3.0 seconds after first contacting the semisolvent.

3. A process as defined in claim 1 wherein the polyester is a glycol-terephthalate condensation polymer.

4. A process as defined in claim 1 wherein the shaped structure is a polyethylene terephthalate filament.

5. A process as defined in claim 1 wherein the structure is dyed during the process.

6. A process as defined in claim 1 wherein the structure is dyed with coloring material introduced primarily into the surface sheath provided by the treatment.

7. In the production of oriented synthetic linear ethylene terephthalate polyester fibers by spinning from a solvent-free melt of the polyester to form substantially unoriented solid fibers and then drawing the fibers, the method of modifying the fiber surface to provide a distinct sheath-core structure which comprises passing the dry substantially unoriented fibers continuously into contact with a liquid semisolvent for the polyester and then into a water bath at a temperature of about 80° to 100° C. within 0.2 second to about 3.0 seconds after contacting the semisolvent, then drawing the heated wet fibers until oriented and collecting the oriented fibers.

References Cited in the file of this patent

UNITED STATES PATENTS

| | | |
|---|---|---|
| 2,287,099 | Hardy et al. | June 23, 1942 |
| 2,300,472 | Sowter et al. | Nov. 3, 1942 |
| 2,898,178 | Kruckenberg | Aug. 4, 1959 |